UNITED STATES PATENT OFFICE.

FRANK V. POOL, OF NEWARK, NEW JERSEY, ASSIGNOR TO THE CELLULOID MANUFACTURING COMPANY, OF NEW YORK N. Y.

PROCESS OF REMOVING FLOCCULENT MATTER FROM SPENT ACIDS.

SPECIFICATION forming part of Letters Patent No. 251,938, dated January 3, 1882.

Application filed March 26, 1880. (No specimens.)

*To all whom it may concern:*

Be it known that I, FRANK V. POOL, of Newark, in the county of Essex and State of New Jersey, have invented a new and useful Improvement in Processes of Removing Flocculent Matter from Spent Acids, of which the following is a specification.

The invention has relation to an improved process of removing flocculent matter from spent acids used in the treatment of soluble fiber, such as nitro-cellulose, gun-cotton, &c. These spent acids are contaminated to a greater or less extent with a "flock," or flocculent matter, which becomes detached from the fiber during the treatment, and which, if undisturbed, will remain in suspension for an indefinite length of time. To remove this flocculent matter, and thereby make the restoration of the acid possible, is the object of the invention.

The novelty of the invention consists in mixing with the acid or acidulous compound after it has been employed in treating the soluble fiber, and which contains the flocculent matter or sediment in suspension, barium sulphate (known also as "barytes," "sulphate of baryta," "heavy spar," &c.) in powdered form, and then allowing the whole to stand until precipitation has taken place.

In the employment of my invention I take the barium sulphate in a powdered form and introduce the same into the acid solution and agitate the whole in any convenient way, after which I permit it to stand until precipitation has taken place, the effect being to completely remove the objectionable elements. The purified result is then saved for future use.

I have found that with a tank about four feet in depth, containing, say, about six hundred and fifty gallons of nitric and sulphuric acids, by introducing, say, thirty pounds of barium sulphate in powdered form, the precipitation will be satisfactorily effected in from thirty-six to seventy hours. The setting agent will be in a finely-comminuted form, and will be introduced as may be convenient, the quantity being varied according to circumstances, and the agent being permitted to remain in the acid or acidulous compound for a greater or shorter period, according to the conditions of the case.

I do not claim herein the right to the use of barium sulphate or any other inert material for the purpose of removing matter in suspension from other liquids than spent acids, as I have filed another application for Letters Patent in which I have claimed the right to the use of barium sulphate and all other inert materials for the purpose of removing matter in suspension without regard to the nature of the matter or the liquid in which it occurs, excluding from said application, however, what I have described and claimed herein.

What I claim as my invention, and desire to secure by Letters Patent, is—

The within-described process of removing flocculent matter from spent acids which have been used in the treatment of soluble fiber, which consists in introducing into the acid solution barium sulphate in powdered form and permitting the whole to stand until precipitation has taken place, substantially as set forth.

In testimony that I claim the foregoing improvement in processes of purifying liquids, as above described, I have hereunto set my hand this 17th day of March, 1880.

FRANK V. POOL.

Witnesses:
CHAS. C. GILL,
WM. BRO. SMITH.